(12) United States Patent
Ducatel et al.

(10) Patent No.: US 9,275,145 B2
(45) Date of Patent: Mar. 1, 2016

(54) ELECTRONIC DOCUMENT RETRIEVAL SYSTEM WITH LINKS TO EXTERNAL DOCUMENTS

(75) Inventors: Gery M. Ducatel, Ipswich (GB); Nader Azarmi, Colchester (GB); Zhan Cui, Colchester (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 1259 days.

(21) Appl. No.: 12/593,368

(22) PCT Filed: Mar. 26, 2008

(86) PCT No.: PCT/GB2008/001040
§ 371 (c)(1),
(2), (4) Date: Sep. 28, 2009

(87) PCT Pub. No.: WO2008/117045
PCT Pub. Date: Oct. 2, 2008

(65) Prior Publication Data
US 2010/0106701 A1    Apr. 29, 2010

(30) Foreign Application Priority Data
Mar. 28, 2007 (EP) ................................. 07251333

(51) Int. Cl.
*G06F 17/30* (2006.01)
(52) U.S. Cl.
CPC ................................ *G06F 17/30864* (2013.01)
(58) Field of Classification Search
CPC ................ G06F 17/30864; G06F 17/30861; G06F 17/30867

USPC ..................... 707/706, 710; 709/217, 218
See application file for complete search history.

(56) References Cited

U.S. PATENT DOCUMENTS

| 6,490,575 B1 | 12/2002 | Berstis |
| 6,591,261 B1 | 7/2003 | Arthurs |
| 6,976,053 B1 | 12/2005 | Tripp et al. |

(Continued)

FOREIGN PATENT DOCUMENTS

| EP | 1 182 581 | 2/2002 |
| WO | 01 82129 A1 | 11/2001 |

(Continued)

OTHER PUBLICATIONS

Brandman et al., "Crawler-Friendly Web Servers", SIGMETRICS Perform. Eval. Rev, 28, 2 (Sep. 2000), pp. 9-14.

(Continued)

*Primary Examiner* — Chat Do
*Assistant Examiner* — Sergio J Curbelo, III
(74) *Attorney, Agent, or Firm* — Nixon & Vanderhye P.C.

(57) ABSTRACT

An electronic document retrieval system is disclosed. It has particular utility to World-Wide Web searching. The system requires webmasters to put forward categories into which the pages on their web-site might sensibly be divided, and to provide a list of those categories together with a list of popular keywords associated with those categories to a global search engine. The global search engine is then able to augment one or more of its search results with links to category-heading pages which most closely relate to the query provided by the user. In this way, a user is able to find the page most relevant to his query more rapidly than has hitherto been possible.

11 Claims, 8 Drawing Sheets

(56) References Cited

U.S. PATENT DOCUMENTS

| | | |
|---|---|---|
| 7,085,753 B2 * | 8/2006 | Weiss et al. ............... 707/710 |
| 2002/0027567 A1 | 3/2002 | Niamir |
| 2006/0036582 A1 | 2/2006 | Sondergaard et al. |
| 2006/0036583 A1 | 2/2006 | Sondergaard et al. |
| 2006/0287985 A1 | 12/2006 | Castro et al. |
| 2007/0050344 A1 * | 3/2007 | Rind et al. ............... 707/3 |

FOREIGN PATENT DOCUMENTS

| | | |
|---|---|---|
| WO | 2004/102305 | 11/2004 |
| WO | WO 2004/102305 | 11/2004 |
| WO | 2007/001974 A1 | 1/2007 |

OTHER PUBLICATIONS

Bowman et al., "Harvest: A Scalable, Customizable Discovery and Access System", Technical Report CU-CS-732-94, Department of Computer Science, University of Colorado—Boulder, Aug. 1994 (Revised Mar. 1995) pp. 1-29.

Hardy et al., "Harvest User's Manual", version 1,3, Sep. 7, 1995, 10 pgs.

Ducatel et al., "Hybrid Ontology and Keyword Matching Indexing System", In: Proceedings of IntraWeb Workshop at WWW2006, Edinburgh (2006), 6 pgs.

Milic-Frayling, N., and Sommerer, R., "Enhanced Web Publishing: Towards integration of search and browsing", presented at Libraries in the Digital Age conference, May 2003, 13 pgs.

Craswell et al., "Performance and Cost Tradeoffs in Web Search", in proceedings of the 15th Australasian database conference—vol. 27 (ADC '04), Australia, pp. 161-169.

Koster, Martijn, ALIWEB "Archie-like indexing in the WEB", Computer Networks and ISDN Systems, vol. 27, Issue 2, Nov. 1994, pp. 175-182.

International Search Report for PCT/GB2008/001033 mailed Jun. 4, 2008.

Office Action dated May 25, 2011 issued in co-pending U.S. Appl. No. 12/593,366.

U.S. Appl. No. 12/593,366, filed Sep. 28, 2009 (U.S. Publication No. 2010-0049762).

International Search Report for PCT/GB2008/001040 mailed May 23, 2008.

Hamard et al., "A Digital Libraries System based on Multi-level Agents", Mar. 1999, 13 pp.

* cited by examiner

| Category | Leading URL | Keywords |
|---|---|---|
| e-shop | www.bt.com/e-shop.htm | "shop","sales","products","buy now", "basket" |
| | | product name #1 |
| | | product name #2 (="freestyle7250") |
| | | product name #3 |
| | | ............................ |
| Self-service | www.bt.com/support | "troubleshoot", "how to", "aftersales", "when things go wrong" |
| | | product name #1 |
| | | product name #2 (="freestyle 7250") |
| | | product name #3 |
| | | ............................ |
| billing & payment | www.bt.com/billing | "my account", "bill", "payment", "credit card" |
| consumables | www.dabs.com/bt/products/consumables | "battery","batteries", "toner", "cartridge" |
| | | product name #2 (="freestyle7250") |
| | | product name #3 |

ELECTRONIC DOCUMENT RETRIEVAL SYSTEM WITH LINKS TO EXTERNAL DOCUMENTS

This application is the U.S. national phase of International Application No. PCT/GB2008/001040 filed 26 Mar. 2008 which designated the U.S. and claims priority to European Patent Application No. 07251333.6 filed 28 Mar. 2007, the entire contents of each of which are hereby incorporated by reference.

The present invention relates to an electronic document retrieval system and method. It has particular utility in identifying and retrieving information from the World-Wide Web which relates to a query input by a user.

At the time of writing it is estimated that the World-Wide Web includes tens of billions of pages. Search engines such as Google and Yahoo have developed sophisticated algorithms in order to be able to identify the very small proportion of those pages which are relevant to a user query.

In general, today's search engines work by creating a full-text index of the content of web-pages. The search engine's crawler will visit a web-page, find key terms in that web-page, and then generate a list which gives, for each set of key terms, a list of web-pages which include or relate to those key terms. The crawler then 'crawls' the links on the page and carries out a similar process with each of the linked pages. It will be realised that if such an index is to point to even a small fraction of the pages included in the World-Wide Web, it will nevertheless be an exceptionally large index.

The index is then used to find web-pages which relate to the key terms found in a user's query. There are of course potentially a very large number of web-pages which include the key-terms. Today's search engines order the lists in which these 'hits' are presented by counting how many other pages include a link to each page in the list.

International patent application WO 04/102305 discloses a global search engine which maintains a keyword-to-web-page association table for each web-site. It first presents a user who enters a search query with a list of relevant sites, each entry in the list displayed on the user's computer having a 'search site' button which the user can click on to trigger a search within the selected web-site. This does not quickly provide a user with the information he requires since the user must wait for the first search result and then request a second search before getting a link to the page in which he is interested.

U.S. Pat. No. 6,976,053 has nodes on the network building local meta data. This meta data is then centralised to create a searchable index. Where conventional global search engines are purely top down, i.e. a crawler centralises an index for nodes on a network, the system proposed in U.S. Pat. No. 6,976,053 is purely bottom up: nodes are responsible for reporting to a central index. However the system disclosed in U.S. Pat. No. 6,976,053 does not provide a user with the ability to submit a query that can seamlessly travel from one global search engine, through a local search and land the user on a page on a local web site with one click of the user's mouse.

Search engine providers must deal with the competing requirements of web-site owners and users. Search engines try to ensure that web-site owners cannot achieve a higher ranking for their web-page in response to a user query than that page deserves given its quality and relevancy to the query.

Web-site owners currently have little control over how any 'hits' linking to pages on their web-site are displayed. Web-site owners can influence which pages on their site are included in the search engine's index, by presenting the search engine's crawler program with a 'Sitemap' which indicates a ranking of the most important pages on the web-site. It is generally accepted that the World-Wide Web is too large for crawlers to visit (and therefore include in the global index) every page on each web-site. Hence, web-site owners can use Sitemaps to influence which pages on their web-site are likely to be included in a search engine's list of results (though Sitemaps will not influence where in that list the 'hit' appears).

A more recent development is the introduction by Google of 'Sitelinks'. Here, when the search engine algorithm returns the home page of a web-site as a result, that result is supplemented with supplementary links to key web-pages from within the web-site. These supplementary links are arranged on the user's display to appear as subsidiary to the main search result (i.e. the link to the home page). In Google's result pages, the subsidiary links are directly below the main search result, but are indented and, in contrast to the main search result, have no excerpt of wording from the web-pages they link to and no displayed URL. According to Google's Webmaster Help Center, the key pages are identified by the crawler by analysing the link structure of the web-site.

International patent application WO 07/001,974 assigned to Google Inc discloses other ways in which the 'Sitelinks' feature might be provided. According to the proposals put forward in the patent application, Google's computers aggregate information about which web-pages a user browses—that information being sent by the computer running programs like the 'Google Toolbar' (provided in that case the user allows the information to be sent). By aggregating this information, Google would be able to build up data which shows which pages on a given web-site are most visited by users, and links to those pages might supplement one or more 'hits' on the search results page. In an alternative embodiment, it is suggested that web-site providers might provide the search engine system with a list of web-pages favoured by the provider.

According to a first aspect of the present invention there is provided an electronic information retrieval system comprising:

a plurality of collection-hosting computers operable to provide information from respective stored collections of hyperlinked documents, a global search engine computer, a user's computer having a user input device and a display, said information retrieval system further comprising a network interconnecting said search engine computer, said one or more collection-hosting computers and said user's computer; each of said computers including software allowing data transfer between said computers;

wherein each of said plurality of collection-hosting computers is arranged in operation to generate a category index indicating associations between keywords and/or key phrases, and category-heading documents in said collection;

said search engine computer is arranged in operation to:
  i) receive said category index from each of said plurality of host computers;
  ii) receive a search query from said user's computer and to select one or more globally-selected documents found to be relevant to the query;
  iii) identify the document collection to which said globally-selected document belongs;
  iv) identify one or more relevant category-heading documents within the relevant collection in dependence on words or phrases in said query and the category index associated with said collection;

v) send to said user's computer a search result including a hyperlink to said globally-selected document along with one or more hyperlinks to said relevant category-heading documents; and said user's computer is arranged in operation to:

i) allow said user to enter said search query using said input device to seek relevant documents from said plural collections of documents; and ii) display said search result on the user's computer's display.

By having the administrators of electronic document collections provide global search engines with category indices which associate keywords with category-heading documents in the document collection, and after having identified a relevant document from amongst the plurality of collections as relevant to a query received from a user, to use the category index specific to the collection containing the relevant document to select one or more relevant category-heading documents within the given collection, and thereafter including links to the one or more relevant category-heading documents alongside a link to the relevant document, an electronic information system via a which a user is able to find relevant information more quickly than has hitherto been possible is provided.

It is to be understood that the word global is used in the sense of 'relating to a plurality of electronic document collections' and is not always to be understood to mean that the search engine enables the finding of documents from computers situated all around the globe. Nevertheless, the present invention is particularly advantageous where the number of collections and/or the size of those collections is of the magnitude seen in the World-Wide Web.

The use of local keyword/category information provided by document collection administrators in combination with information kept by global search engines usefully combines the domain-specific expertise of local administrators with the scale and independence of global search engines.

The system is of particularly utility in embodiments where wherein said documents comprise World-Wide Web pages, and said collections comprise web-sites. It is particularly advantageous when applied to the World-Wide Web since the providing of links to relevant local web-pages means that users are able to quickly find the information they seek despite the World-Wide Web's enormous scale.

In some embodiments, said collection of documents is organised in a hierarchy, and said category-heading pages comprise section-heading pages which, in the hierarchy, are above other pages within the section.

Preferably, each of said plurality of collection-hosting computers generates said category index by selecting keywords in dependence upon the specificity of keywords to the category headed by said category-heading documents in said collection. Those words which are found to be specific to the category in questions are selected as keywords. In refinements of such embodiments, words which are unique to the category in question are discounted as keywords (they are in some sense too specific).

In still better embodiments, each of said plurality of collection-hosting computers generates said, category index by also selecting keywords in dependence the popularity of use of the keyword in user queries. Those keywords which are found to be very popular without being extremely popular, and also to be specific to the category in question, are selected as keywords.

In preferred embodiments, each collection-hosting computer stores said category index data and document categorisation data which associates one or more local documents with local category-heading pages;

said search engine computer is further arranged in operation to:

vi) respond to the user clicking on one of said category-heading document links in said search result page by forwarding to the relevant collection-hosting computer a categorised search query comprising an indication of which category-heading page link was selected by the user and the user's original search query;

said collection-hosting computer further being arranged in operation to receive said categorised search query from said search engine computer and to select a local document accordingly, and to return the selected local document to the user.

These preferred embodiments have the advantage that the search engine computer returns to the user a link which might well lead directly to the information which the user is seeking—the choice of that link for display to the user being informed both by the general scale of the global search engine and the domain-specific accuracy of the local search engine.

There is now provided, by way of example only, a description of specific embodiments of the present invention. The description is given with reference to the accompanying drawings in which:

FIG. 2 shows an abbreviated site-specific index provided by a web-site provider to the global search engine provider;

Figure 1:
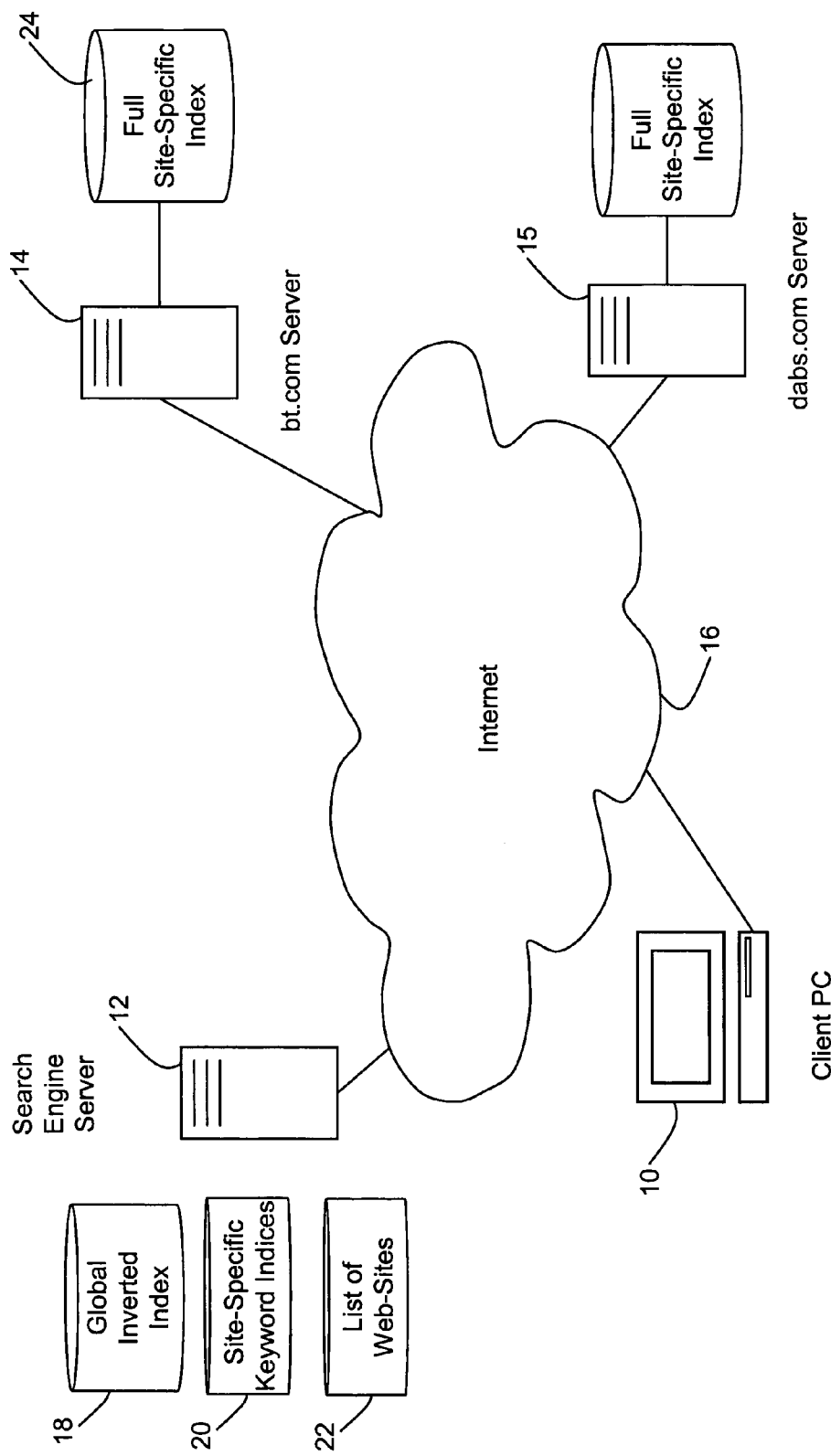
FIG. 1 shows the hardware used in the global search engine system according to a first embodiment.

FIG. 1 shows a client PC 10, search engine server 12 and web-site servers 14, 15 connected to one another by the Internet 16. Those skilled in the art will know that the actual World-Wide Web has tens of millions of web server computers like web-site servers 14,15 serving more than ten billion 'indexable' web-pages between them. The number of PCs like client PC 10 connected to the Internet is estimated to be several hundreds of millions. To generate and store a global index which covers a reasonable fraction of the world-wide web therefore requires server farms rather than the single search engine server seen in FIG. 1. It is estimated, for example, that Google's services are provided using nearly half-a-million computers.

The search engine server 12 has access to a first permanent storage device 18 which stores a full-text inverted index of hundreds of millions of web-pages—a global index. That index is conventional and will not be described further here. The search engine server 12 further has access to a second permanent storage device 20 which stores a plurality of site-specific indices (the composition of which will be described with reference to FIG. 2 below), and a third permanent storage device 22 which stores a list of the URLs of the home page of many web-sites accessible via the Internet 16.

The bt.com web-site server 14 has access to a fourth permanent storage device 24 which stores a full site-specific index for the web-site. The dabs.com web-site server 15 has a similar full site-specific index.

Those skilled in the art will be fully aware of the hardware included in modern computers, so no description of the hardware components of the web server computers and client PCs which make up the World-Wide Web will be given here.

Using a process which will be described below, the webmaster of each web-site computer generates a site-specific keyword/category index. The site-specific index (FIG. 2) presents records for each of a plurality of webmaster-defined categories of web-pages. Each record includes a name for the category (leftmost column), the Uniform Resource Locator (URL) for the web-site's main page in that category (second column), a list of keywords associated with that category (third column).

It is to be noted that the leading page entry in a record might even refer to a page on a different web-site—e.g. one served by dabs.com web-server 15. As will be explained below, this can allow a user whose query, when handled by a global search engine which lacks web-site specific knowledge, to be presented with a link to a web-site held at a different network address to the web-site which generated the site-specific index. Thus, in some sense, the user's browsing can be re-directed in the right direction even when his query in combination with the global search engine has not led him immediately to the web-site which contains the information he requires.

Figure 3A:
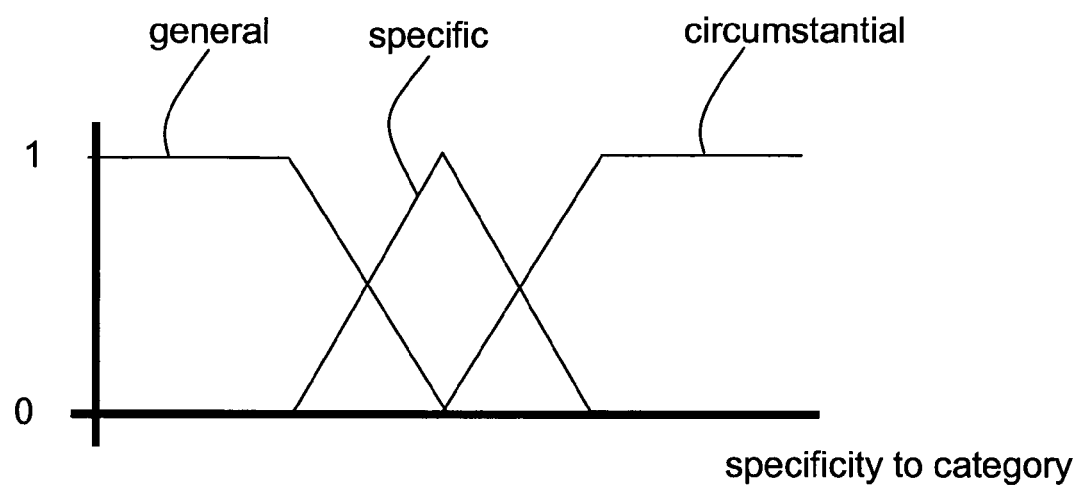
FIGS. 3A and 3B are graphs showing keywords' membership of fuzzy sets relating to keyword specificity and frequency of keyword occurrence in queries.

FIG. 3A is a graph showing the degree to which keywords might belong to the fuzzy sets 'general', 'specific' and 'circumstantial'. Since the concepts of 'general', 'specific' and 'circumstantial' are not clearly defined, it is useful to use fuzzy sets to represent whether a keyword is 'general', 'specific' or 'circumstantial'. How a keyword's degree of membership to the three sets is determined will be explained with reference to FIG. 4 below.

Figure 3B:
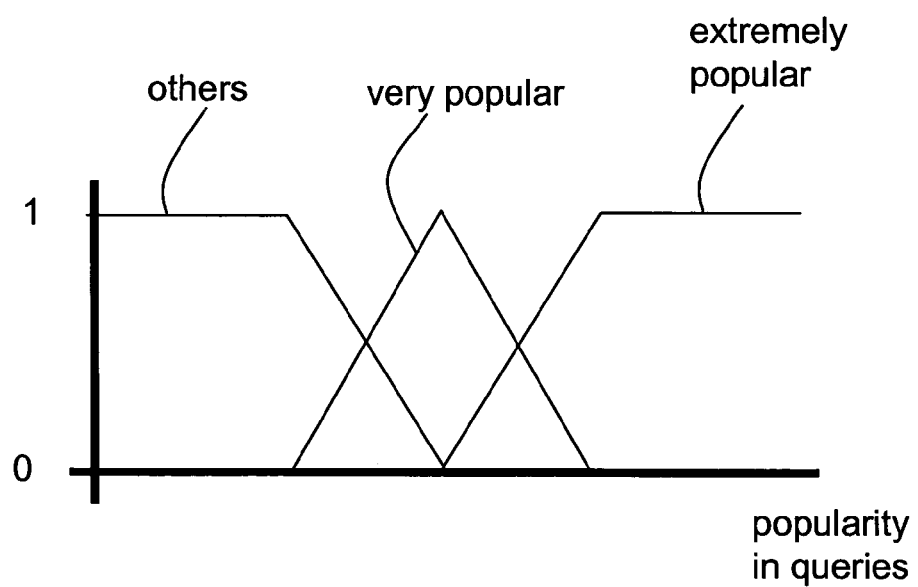

FIG. 3B is a graph showing the degree to which keywords might belong to the fuzzy sets 'less than very popular', 'very popular' and 'extremely popular'. How a keyword's degree of membership of the three sets is determined will be explained with reference to FIG. 4 below.

Figure 4:
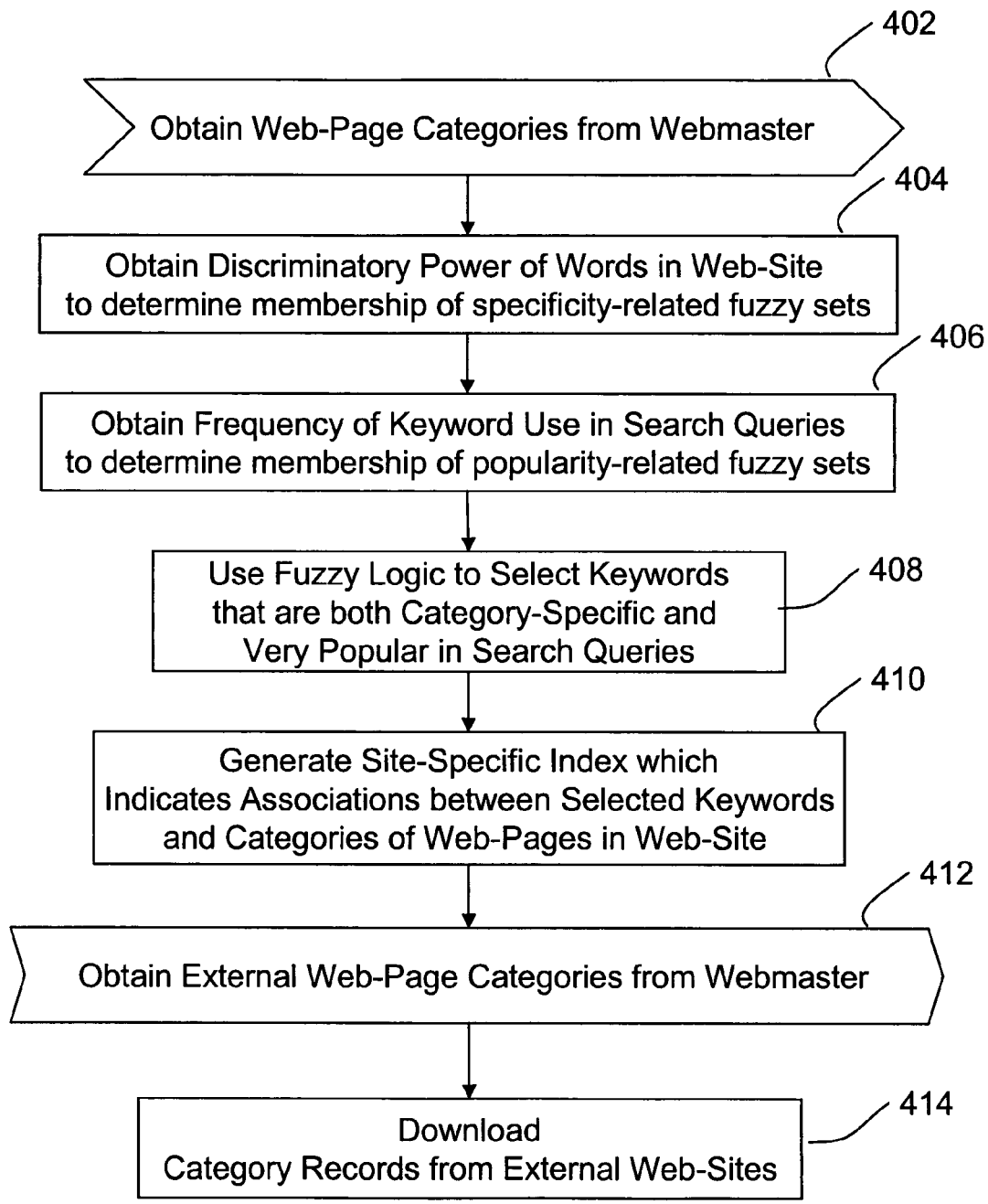
FIG. 4 shows the site-specific index building process carried out by each web-server computer.

The webmaster of each web-server installs a program which helps to build the site-specific index of FIG. 2 using the process shown in FIG. 4. The local index building process (FIG. 4) begins with the presentation of a user-interface on the display of a screen associated with the web-server 14 which prompts (step 402) the webmaster to identify different categories into which the webmaster believes the pages of the web-site might usefully be grouped. The webmaster indicates which web-pages in the web-site belong to which categories.

The program then visits the listed pages in each category-site, and using, for example, the well-known term-frequency/inverse document frequency measure, calculates how specific words included in those pages are to each category. The results of this calculation are then used (step 404) to determine the degree to which each word belongs to the fuzzy sets 'general', 'specific' and 'circumstantial' for each category. It will be understood by those skilled in the art that the limits of each fuzzy set can be adjusted by trial and error until the fuzzy set membership accords with the webmaster's 'feel' for which words are category-specific and which are not.

Thereafter, the frequency of use of different words in search queries is found from search engine query logs. Once again, this is used as a basis of a calculation (step 406) of the degree of membership of each word to the fuzzy sets 'extremely popular', 'very popular' and 'others'. Again, the limits of each fuzzy set can be adjusted by trial and error until the fuzzy set membership accords with the webmaster's 'feel' for which words are category-specific and which are not.

Fuzzy logic techniques are then used to find (step 408), for each category, the intersection of the sets 'category-specific' and 'very popular'. Those keywords are then added to a category record for each webmaster-identified category to build (step 410) the first three category records (all internal) in the site-specific index shown in FIG. 2.

It will be understood that the above process could be carried out by each web-server computer in relation to each web-site. Where the webmaster wishes to include categories for which users are best to visit external web-sites, the webmaster enters the URL of the relevant category-heading page on the external web-site into the web-server when prompted (step 412) to do so. The ssi.txt file can then be requested in the same way as described in relation to the search engine server above, and the relevant category record(s) extracted and added (step 414) to the site-specific index.

Figure 5:
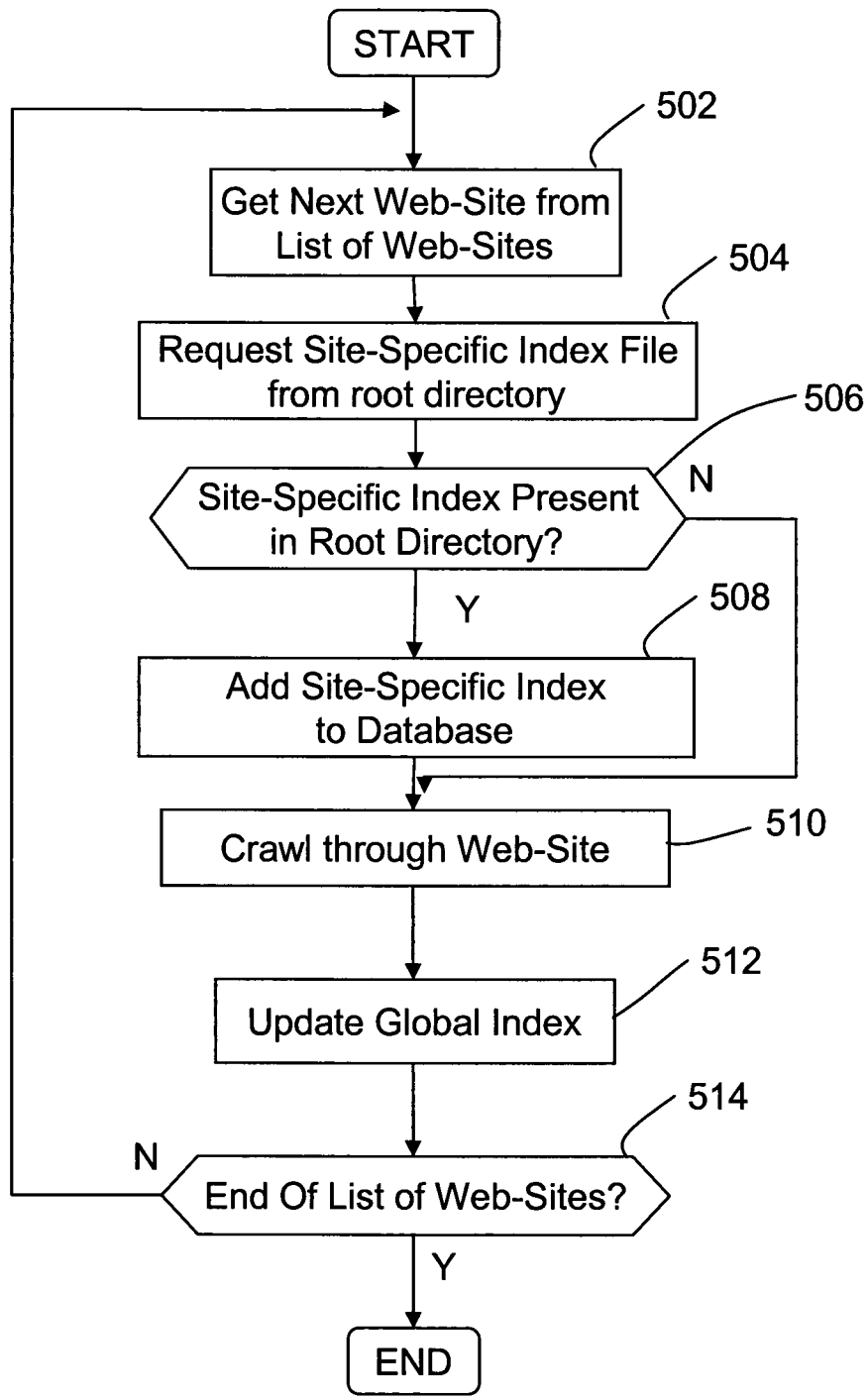
FIG. 5 shows processing carried out by the search engine provider when generating global and site-specific index information.

The index-building activities (FIG. 5) of the search engine server begin with the server fetching (step 502) the URL of a home page of the next web-site in the list of web-sites in store 22. Thereafter, the search engine server 12 seeks to retrieve (step 504) a site-specific index file from the directory containing the home page of the web-site. This is achieved in the present embodiment by the file having an agreed name and file extension—for example 'ssi.txt' and the server requesting that file using an Hypertext Transfer Protocol (HTTP) GET request.

If found, the data in the site-specific index file is added (step 508) to the database in the store 20 holding the site-specific indices, with a field being added to each of the category records which indicates the web-site from which the index was retrieved. Whether or not a site-specific index file is found, the index-building activities of the search engine server 12 continue with the search engine server 'crawling' (step 510) the web-site in a conventional manner and updating (512) its global index stored in store 18 in accordance with the web-pages it crawls. The index-building steps (502-512) are repeated for each web-site included in the list in store 22. Those skilled in the art will realise that the list of web-sites might be so large as to mean that index-building process needs to run continuously in order to keep the global index acceptably up-to-date.

The search query handling process (FIG. 6) of the search engine server 12 begins with the receipt (step 602) of the search string from the client PC 10. The query handling process is initially conventional, using (step 604) the full-text index in store 18 to find web-pages which contain the words included in the search string, and then sorting those web-pages in order of likely relevance to the user (step 606).

In contrast to conventional search engine query handling processes, in the present embodiment the search engine server 12 then proceeds to identify (step 608) the web-site which contains the most relevant web-page and retrieves the site-specific index from the database in store 20. In alternative embodiments, the site-specific index could instead be retrieved from the web server 14,15 at this stage. However, this is not preferred since the speed with which a user is provided with a search result by the search engine server 12 is considered very important.

A site-specific query handling process is then carried out (step 612) to identify the three most relevant categories for a user query, on the basis of any keywords present in both the user query and the site-specific index. In preferred embodiments, the three chosen categories are ranked in order of relevancy to the query.

To give an example, if the user types the query 'Freestyle 7250' and the global search engine identifies the page 'www.bt.com/textbundle' as the most relevant page on the World-Wide Web, then the search engine computer will retrieve the category index associated with www.bt.com (i.e. the example of FIG. 2) and find the keyword (product name #2 in this case) associated with the categories 'e-shop', 'self-service' and 'consumables'.

Figure 6:
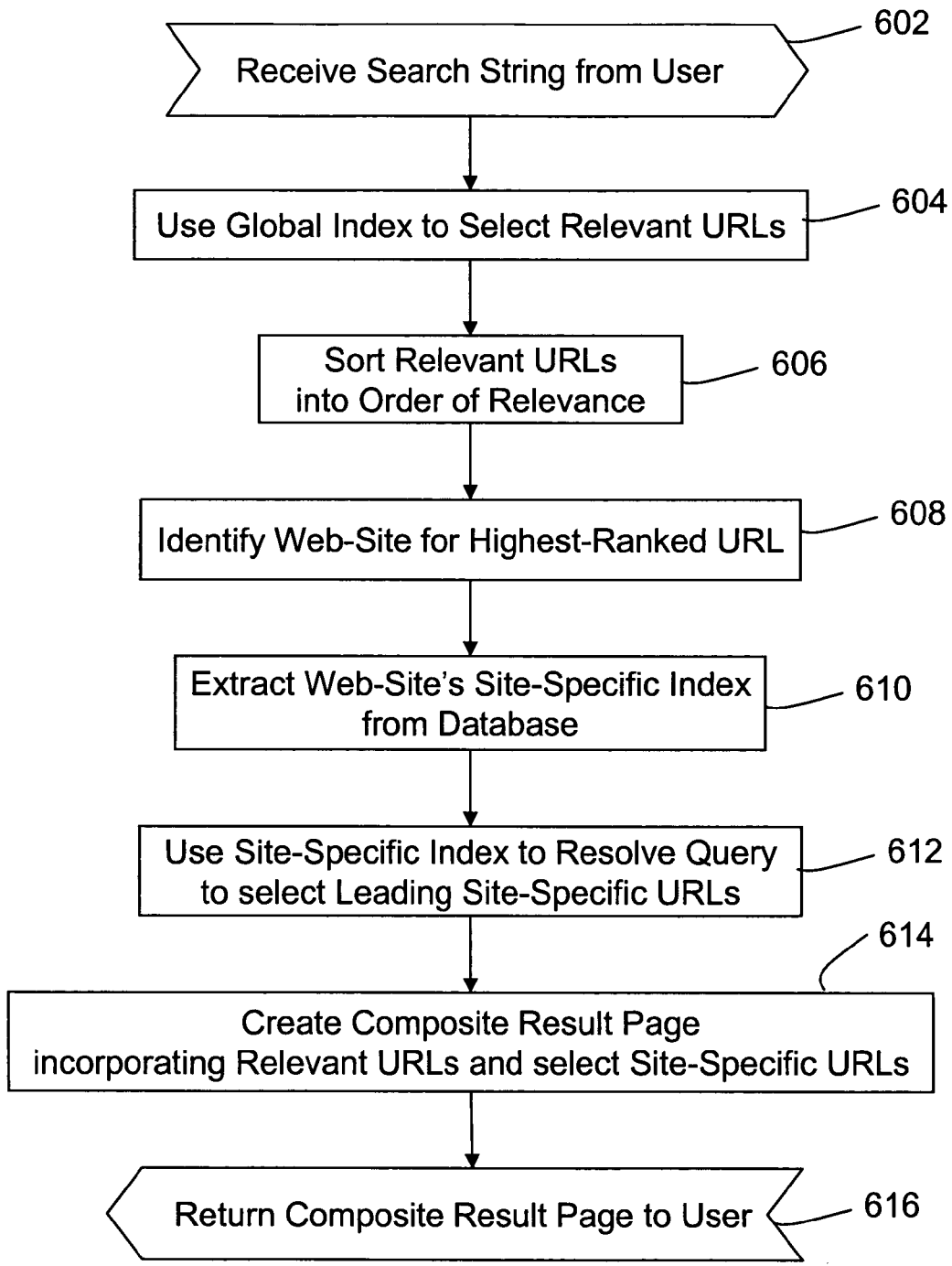
FIG. 6 shows processing carried out by the search engine provider in response to a user search query.
Figure 7:
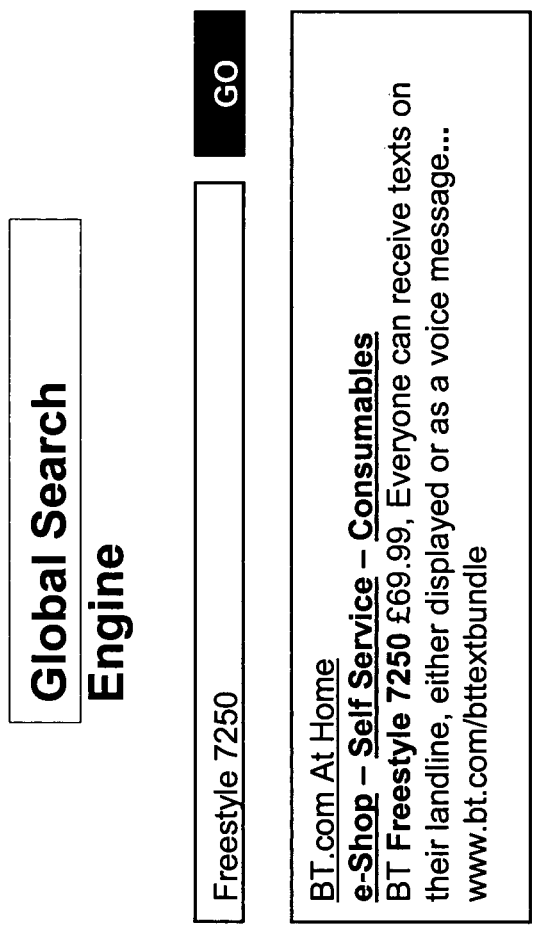
FIG. 7 shows an example of a search, result page that might be returned to the user.

The search engine server 12 then creates (step 614) a web-page displaying an entry for each of the most relevant web-pages found by the global search query handling process (steps 604-608). The entry for each of the most relevant web-pages begins with a hyperlink 702 to the web-page (the hyperlink text usually being the title of the web-page), with a snippet 704 from the text of the web-page quoting that part of the text which most closely matches the query string received from the user below that (with any search terms highlighted 706), and the URL 708 of the web-page below the snippet 704. As seen in FIG. 7, in addition to those conventional components, the entry for at least the most relevant web-page additionally has hyperlinks 710 to the leading pages relating to the categories identified as most relevant in the site-specific query handling process (FIG. 6, step 612). Those hyperlinks are located directly under the web-page title and arranged in order of decreasing relevance (left-to-right) in this embodiment. The text of each of the hyperlinks is the name of the category taken from the site-specific index (FIG. 2, left-hand column). Many other arrangements of the same components are of course possible without departing from the scope of the present invention. For example, the subsidiary links might be below the main search result's snippet, and indented. The subsidiarity of the links might be displayed by various formatting conventions similar to those used in indicating sub-headings in a written document.

The dynamically-created web-page is then returned to the user's PC 10 where the browser program running on that PC renders a page having an entry like that seen in FIG. 7 on the display of the user's PC.

The search results presented to the user thus include hyperlinks to the category-leading web-pages which the webmaster (who likely has a better knowledge of the web-site) has indicated are probably most useful to the user. The user can then click on one of those hyperlinks and receive see the selected category-leading web-page in the browser of their PC.

It will be seen how having the search engine server 12 combine a conventional global query handling process with a site-specific query handling process, and presenting the results of both processes in one or more result entries on the web-page displayed in the user's browser, a technique which allows webmasters to present within the global search results a hyperlink to the "landing page" preferred by the webmaster in response to the query is provided. This provides a search engine service which allows the user to see a preferred "landing page" following just a single click on the search results page.

Figure 8:
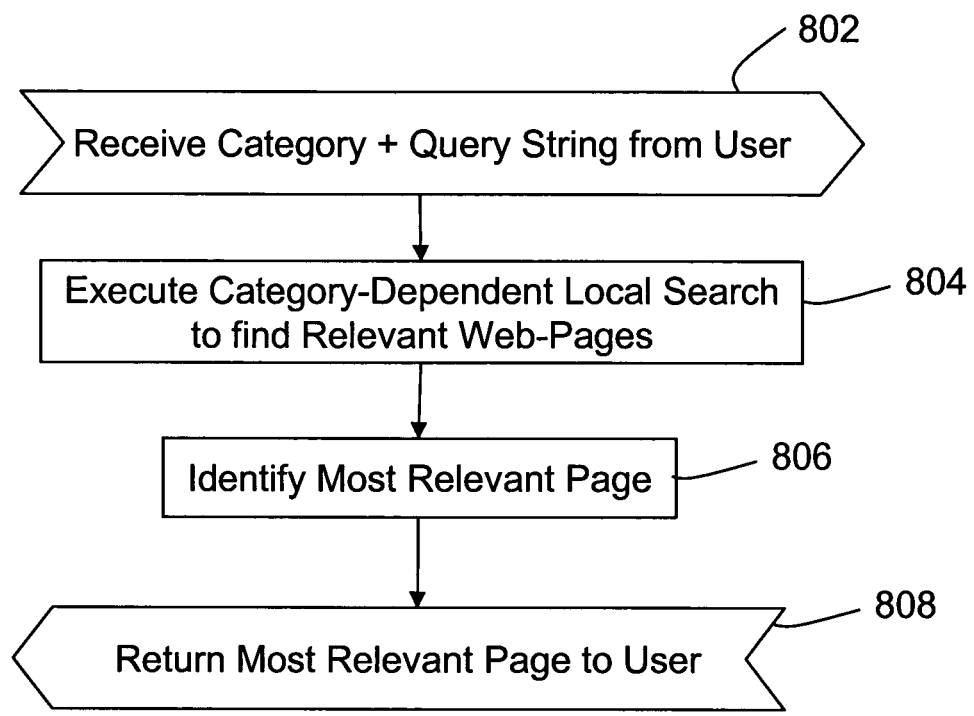
FIG. 8 shows further processing carried out by the web-site server in response to the user selecting one of the site-specific links seen on the search result page.

Further processing carried out by the web-site server 14 in a preferred embodiment of the present invention will now be described in relation to FIG. 8. In this embodiment, instead of the hyperlink from the search results page just pointing to a URL to the preferred landing page, the hyperlink instead points to an active service page or the like and includes the category name associated with the web-page in the site-specific index, and the user's search string. Those skilled in the art will know how such information can be passed in an HTTP request to the web-site server 14.

On receiving the request (step 802), the web-site server 14 carries out (step 804) a category-dependent web-site search to find pages relevant to the user's query. The most relevant of those pages is then identified (step 806) and returned (step 808) to the user who sees the page displayed on the display of their PC.

In this way, the user might arrive directly at a relevant page by clicking on one or the supplementary links (e.g. 'e-shop') displayed on the search result page (FIG. 7). Indeed, the user might be unaware that both a global and local search engine process have been used in order to return the relevant page.

Suitable category-specific search techniques are disclosed in Géry Ducatel, Zhan Cui, Ben Azvine (2006) Hybrid Ontology and Keyword Matching Indexing System, Proceedings of WWW06 conference, Edinburgh. Other category-specific search techniques will be known to those skilled in the art.

There are many different embodiments of the present invention. Possible modifications to the above embodiments include:

i) although described in relation to the World-Wide Web supported by the global Internet, those skilled in the art could adapt the above embodiment to work in document retrieval systems of a much smaller scale. For example, the invention could be applied to a corporate Intranet, or to a local area network connecting a client PC to a local file server. It might well be useful in searching for relevant e-mails in a typically burgeoning mailbox stored on an enterprise mail server. It will be realised that the documents need not be HTML or XHTML coded documents, they could be e-mail messages, word processor documents, or any other type of machine readable text;

ii) the scale of the permanent storage used by the search engine server can similarly take various forms—for a single server, the storage might take the form of a hard disk, or a Redundant Array of Inexpensive Disks, or a Storage Area Network, or a plurality of such things;

iii) in the above embodiment, the site-specific query handling process (step 612, FIG. 6) identified the three most relevant categories to the query being handled. Of course, in other embodiments, only the most relevant category might be selected, or any reasonable number (two to six is preferred) of categories might be selected. In other embodiments, only categories whose relevancy is judged to exceed some threshold are selected;

iv) in the above embodiment, web-pages were associated with categories in the site-specific index. As a further refinement, parts of web-pages (for example paragraphs or frames) would also be associated with categories in the site-specific index.

v) in the above embodiment, related external web-pages were found by requesting the webmaster for the link providing web-site to enter links to external web-pages manually. In other embodiments, the site-specific index building process (FIG. 4) might instead find deep links (i.e. links to external web-sites) in the web-pages of the web-site and pass one or more of the most frequently occurring to the process which then downloads the appropriate category records from the web server hosting the external web-site.

vi) in other embodiments, the keywords for inclusion in the external category records might be derived by downloading the external web-pages and external web server query log and carrying out a keyword selection similar to that used to identify keywords in steps 404 to 408 of FIG. 4.

In summary, an electronic document retrieval system is disclosed. It has particular utility to World-Wide Web searching. The system requires webmasters to put forward categories into which the pages on their web-site might sensibly be divided, and to provide a list of those categories together with a list of popular keywords associated with those categories to a global search engine. The global search engine is then able to augment one or more of its search results with supplementary links to category-heading pages which most closely relate to the query provided by the user. These supplementary links are provided in the first search results page presented to the user. In this way, a user is able to find the page most relevant to his query more rapidly than has hitherto been possible.

The invention claimed is:

1. An electronic information retrieval system comprising:
a plurality of collection-hosting computer systems, each operable to provide information from a specific stored collection of hyperlinked documents, a global search engine computer, a user's computer having a user input device and a display, said information retrieval system further comprising a network interconnecting said search engine computer, said one or more collection-hosting computer systems and said user's computer; each of said computers and computer systems including software allowing data transfer between said computers;
wherein each of said plurality of collection-hosting computer systems is arranged in operation to generate a category index indicating associations between keywords and/or key phrases, and category-heading documents in said collection;
said search engine computer is arranged in operation to:
i) receive said category index from each of said plurality of collection-hosting computer systems;
ii) receive a search query from said user's computer and to select one or more globally-selected documents found to be relevant to the query;
iii) identify the document collection to which said globally-selected document belongs;
iv) identify one or more relevant category-heading documents within the relevant collection in dependence on words or phrases in said query and the category index associated with said collection;
v) send to said user's computer a search result including a hyperlink to said globally-selected document along with one or more hyperlinks to said relevant category-heading documents; and
said user's computer is arranged in operation to:
i) allow said user to enter said search query using said input device to seek relevant documents from said plural collections of documents; and
ii) display said search result on the user's computer's display.

2. The electronic information retrieval system according to claim 1, wherein
said documents comprise World-Wide Web pages, and said collections comprise web-sites.

3. The electronic information retrieval system according to claim 1, wherein
said collection of documents is organised in a hierarchy, and said category-heading pages comprise section-heading pages which, in the hierarchy, are above other pages within the section.

4. The electronic information retrieval system according to claim 1, wherein
each of said plurality of collection-hosting computer systems generates said category index by selecting keywords in dependence upon the specificity of keywords to the category headed by said category-heading documents in said collection.

5. The electronic information retrieval system according to claim 4, wherein each of said plurality of collection-hosting computer systems generates said category index by also selecting keywords in dependence the popularity of use of the keyword in user queries.

6. The electronic information retrieval system according to claim 1, wherein:
each collection-hosting computer system stores said category index data and document categorisation data which associates one or more local documents with local category-heading pages;
said search engine computer is further arranged in operation to:
vi) respond to the user clicking on one of said category-heading document links in said search result page by forwarding to the relevant collection-hosting computer system a categorised search query comprising an indication of which category-heading page link was selected by the user and the user's original search query;
said collection-hosting computer system further being arranged in operation to receive said categorised search query from said search engine computer and to select a local document accordingly, and to return the selected local document to the user.

7. The electronic information retrieval system according to claim 6, wherein
said document categorisation data further indicates the strength of the local document to local category-heading page associations, said collection-hosting computer system being further arranged in operation to take said categorisation strength data into account when selecting a local document for return to the user.

8. The electronic information retrieval system according to claim 1, wherein
said search engine computer is further arranged in operation to create a global index which associates keywords with documents, to receive search queries from said user's computer; and to use said global index to select web-pages which are relevant to each received search query.

9. A search engine computer arranged in operation to:
i) receive, from each of a plurality of collection-hosting computer systems operable to provide information from respective stored collections of hyperlinked documents, a category index indicating associations between keywords and/or key phrases, and category-heading documents in said collection;
ii) receive a search query from a user's computer and to select one or more globally-selected documents found to be relevant to the query;
iii) identify the document collection to which said globally-selected document belongs;
iv) identify one or more relevant category-heading documents within the relevant collection in dependence on words or phrases in said query and the category index associated with said collection;
v) send to said user's computer a search result including a hyperlink to said globally-selected document along with one or more hyperlinks to said relevant category-heading documents.

10. A method of identifying documents relevant to a user query, said method being executed in a computer and comprising the steps of:
i) receiving, from each of a plurality of collection-hosting computer systems operable to provide information from respective stored collections of hyperlinked documents, a category index indicating associations between keywords and/or key phrases, and category-heading documents in said collection;

ii) receiving a search query from a user's computer and to select one or more globally-selected documents found to be relevant to the query;

iii) identifying the document collection to which said globally-selected document belongs;

iv) identifying one or more relevant category-heading documents within the relevant collection in dependence on words or phrases in said query and the category index associated with said collection; and v) sending to said user's computer a search result including a hyperlink to said globally-selected document along with one or more hyperlinks to said relevant category-heading documents.

11. A non-transitory computer readable medium storing a computer program for a search engine computer to perform the steps according to claim 10.

* * * * *